US011873668B2

(12) United States Patent
Piccin et al.

(10) Patent No.: US 11,873,668 B2
(45) Date of Patent: Jan. 16, 2024

(54) VEHICLE INTERIOR PANEL WITH FALL AWAY DOOR

(71) Applicant: Faurecia Interior Systems, Inc., Auburn Hills, MI (US)

(72) Inventors: Hugo Piccin, Cupertino, CA (US); Julien Mohy-Paci, Villerupt (FR); Jean-Michel Azevedo, Sunnyvale, CA (US); Thomas Dessapt, Sunnyvale, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 238 days.

(21) Appl. No.: 17/238,904

(22) Filed: Apr. 23, 2021

(65) Prior Publication Data
US 2022/0341225 A1 Oct. 27, 2022

(51) Int. Cl.
*B60R 7/04* (2006.01)
*E05B 83/32* (2014.01)
*E05B 81/76* (2014.01)

(52) U.S. Cl.
CPC ............ *E05B 83/32* (2013.01); *B60R 7/04* (2013.01); *E05B 81/77* (2013.01); *E05Y 2201/22* (2013.01); *E05Y 2201/246* (2013.01); *E05Y 2201/426* (2013.01); *E05Y 2201/66* (2013.01); *E05Y 2900/538* (2013.01)

(58) Field of Classification Search
CPC . E05B 83/32; E05B 81/77; B60R 7/04; E05Y 2201/22; E05Y 2201/246; E05Y 2201/426; E05Y 2201/66; E05Y 2900/538
USPC ...................................................... 296/24.34
See application file for complete search history.

(56) References Cited

U.S. PATENT DOCUMENTS

| 7,125,063 | B2 * | 10/2006 | Kawamoto | B60R 7/04 |
| | | | | 296/37.8 |
| 7,845,701 | B2 * | 12/2010 | Muller | B60R 7/04 |
| | | | | 296/37.13 |
| 10,328,864 | B2 * | 6/2019 | Yoshida | B60R 11/00 |
| 10,673,170 | B2 * | 6/2020 | Hopfen | B60R 16/03 |
| 11,479,168 | B2 * | 10/2022 | Vorac | B60Q 3/82 |

(Continued)

FOREIGN PATENT DOCUMENTS

| DE | 10039305 B4 * | 7/2005 | ............... B60R 7/06 |
| DE | 102006006236 A1 | 8/2007 | |

(Continued)

OTHER PUBLICATIONS

European Search Report from corresponding European Application No. EP 22169528, 9 pages, dated Sep. 20, 2022.

*Primary Examiner* — Pinel E Romain
(74) *Attorney, Agent, or Firm* — Reising Ethington P.C.

(57) ABSTRACT

A vehicle interior assembly includes a frame and a fall away door that closes off an opening in the frame when in a closed position. The door moves between the closed position and an open position via sequential vertical and horizontal movements. From the closed position, the door first drops vertically to a dropped position. A final portion of this vertical movement may be damped movement. From the dropped position, the door moves horizontally to the open position, at which the door is concealed from view from the exterior of the assembly. Various guides can be provided to define the movement path of the door. Various types of non-visible sensors can be used to detect a user's intention to open and close the door.

20 Claims, 4 Drawing Sheets

(56) References Cited

U.S. PATENT DOCUMENTS

| | | | |
|---|---|---|---|
| 2010/0066113 A1* | 3/2010 | Browne | ............ B60N 2/793 |
| | | | 296/24.34 |
| 2011/0049157 A1 | 3/2011 | Nakamura et al. | |
| 2015/0337572 A1 | 11/2015 | Tsalenko et al. | |
| 2021/0078500 A1* | 3/2021 | Arendsen | ............ B60R 7/06 |

FOREIGN PATENT DOCUMENTS

| | | |
|---|---|---|
| DE | 102012014384 A1 | 1/2014 |
| DE | 102013217901 A1 | 3/2015 |
| DE | 102006062943 B3 | 3/2017 |
| JP | 2014213632 A | 11/2014 |
| JP | 2018012496 A | 1/2018 |

\* cited by examiner

VEHICLE INTERIOR PANEL WITH FALL AWAY DOOR

TECHNICAL FIELD

The present disclosure is related generally to vehicle interiors and, more particularly, to interior panels with moveable doors.

BACKGROUND

Vehicle interiors typically include one or more closeable compartments for storage of personal belongings or for some other use when opened. One example is a glove box, usually located in front of the front passenger seat and having a hinged door that can be opened to access the storage area. Another example is a center console, usually located between the front driver and passenger seats. Such consoles may include a hinged or sliding door that can be opened to access an underlying storage area or accessory. By and large, the door opening functionality of these components is rather rudimentary—i.e., hinges have been around for thousands of years, and manual latches for several hundred. In the meantime, vehicles have evolved to include advanced features with computer processors, sensors, and other systems continuously collecting and processing data to make the driving experience safer and more enjoyable. Vehicle interiors have also become more advanced with multitudes of occupant protection features cleverly concealed from view and wireless communication equipment connecting occupants to in-vehicle and extra-vehicle networks.

Japanese patent document JP2014213632 by Hiroshi et al. discloses a vehicle console with a slidable door that functions as a lid and as an upper tray, or as a middle tray positioned lower in the housing. The door is sized to cover only a part of an opening in the housing and is configured so that the door can longitudinally slide along rails at the sides of a console body. The rails are configured with multiple vertical levels so that the door can be removed and vertically repositioned to slide at a different level. Like many advancements in vehicle storage compartments and consoles, Hiroshi focuses on adding new functionality but fails to make any advances that provide vehicle interior components with a high-tech or otherwise modern flair to compliment the more modern electronic components and luxurious materials that are becoming more prominent in vehicle interiors.

SUMMARY

In accordance with various embodiments, a vehicle interior assembly includes a frame and a door. The frame defines an opening, and the door has a closed position and an open position. The door closes off the opening in the closed position and is concealed from view in the open position. Movement of the door from the closed position to the open position includes vertical movement to a dropped position and horizontal movement from the dropped position to the open position.

In various embodiments, at least a portion of the movement from the closed position to the dropped position is damped movement.

In various embodiments, a first portion of the movement from the closed position to the dropped position is undamped movement and a second portion of the movement from the closed position to the dropped position is damped movement.

In various embodiments, the door is configured to move under the influence of only its own weight from the closed position to the dropped position. At least a portion of the movement from the closed position to the dropped position is an undamped falling movement.

In various embodiments, at least a portion of the movement between the open and closed positions is motorized.

In various embodiments, the door has a perimeter that is concealed from view in the closed position.

In various embodiments, the assembly includes a latch configured to hold the door in the closed position when engaged and to release the door for movement toward the dropped position when disengaged.

In various embodiments, the assembly includes a sensor configured to sense a user intention to open the door.

In various embodiments, the assembly includes a guide configured to constrain horizontal movement of the door during movement between the closed position and the dropped position.

In various embodiments, the assembly includes a guide configured to guide the door in a longitudinal direction and constrain movement of the door in a transverse direction during movement between the dropped position and the open position.

In various embodiments, the assembly includes a guide having a first portion and a second portion. The door follows the first guide during movement between the closed position and the dropped position, and the door follows the second guide during movement between the dropped position and the open position.

In various embodiments, the assembly includes first and second portions of a guide are joined so that the guide is a continuous guide.

In various embodiments, a portion of a guide extends downward from the frame to an end, and a top surface of the door is below said end when in the dropped position.

In various embodiments, the door is downwardly biased when in the closed position such that, when a latch holding the door in the closed position disengages, the door moves toward the dropped position under the force of its own weight and a biasing force.

In various embodiments, the door is longitudinally biased when in the dropped position such that, when the door reaches the dropped position from the closed position, the door moves longitudinally toward the open position under a biasing force.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior assembly with unique door-opening motion that lends a modern or futuristic feel when used by a vehicle occupant. The assembly can be made with a zero-gap condition such that the presence of the door is not readily perceivable until it begins to open. The opening motion includes a vertical drop of the door followed by horizontal movement to a concealed position. The door can be opened or closed based on user touch or gesture, and the opening and/or closing motion can be motorized to achieve the desired effect.

Figure 1:
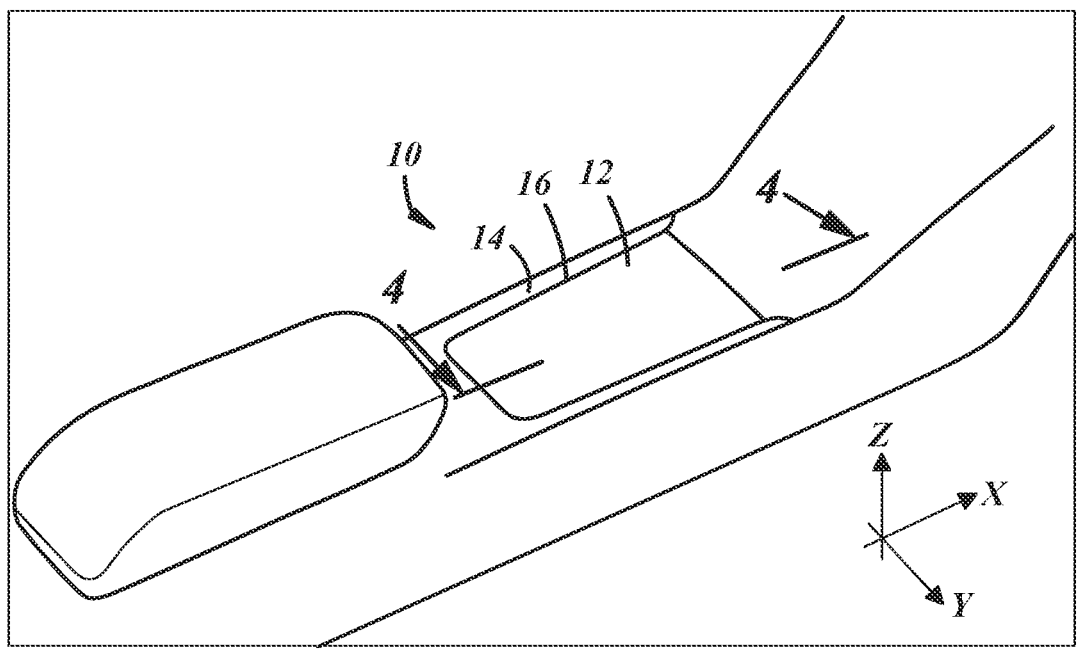
FIG. 1 is a perspective view from above of a vehicle interior assembly with a fall away door.

FIG. 1 is a perspective view from above of an embodiment of a vehicle interior assembly 10 with a fall away door 12. The door 12 is illustrated in a closed position and exhibits sequential vertical (Z) and horizontal (XY) movement between the illustrated closed position and an open position, in which the door is concealed from view. The assembly 10 is a center console in this example and configured to be located between front driver and passenger seats of the vehicle. In other embodiments, the assembly 10 is located elsewhere in the vehicle, such as between second or third row vehicle seats, along an instrument panel, along the outboard side of one or more seats, or in a cargo area of the vehicle. As noted above, the presence of the illustrated door 12 is not apparent when the door is in the closed position as in FIG. 1—i.e., the top surface of the door may be flush with the top surface of the surrounding portions of the assembly, and the outer perimeter of the door is concealed beneath a frame 14.

The frame 14 can be any shape or size and defines an opening 16 of the illustrated console 10. Only an edge of the opening 16 is visible in FIG. 1. When the door 12 moves away from the closed position, such as to the open position, the opening 16 provides access to an interior of the console 10, which may be a storage area and/or house an accessory. The entire base of the console 10 may be considered the frame 14, or the frame may be in the form of one or more pieces supported by the console base, such as one or more trim pieces.

Figure 2:
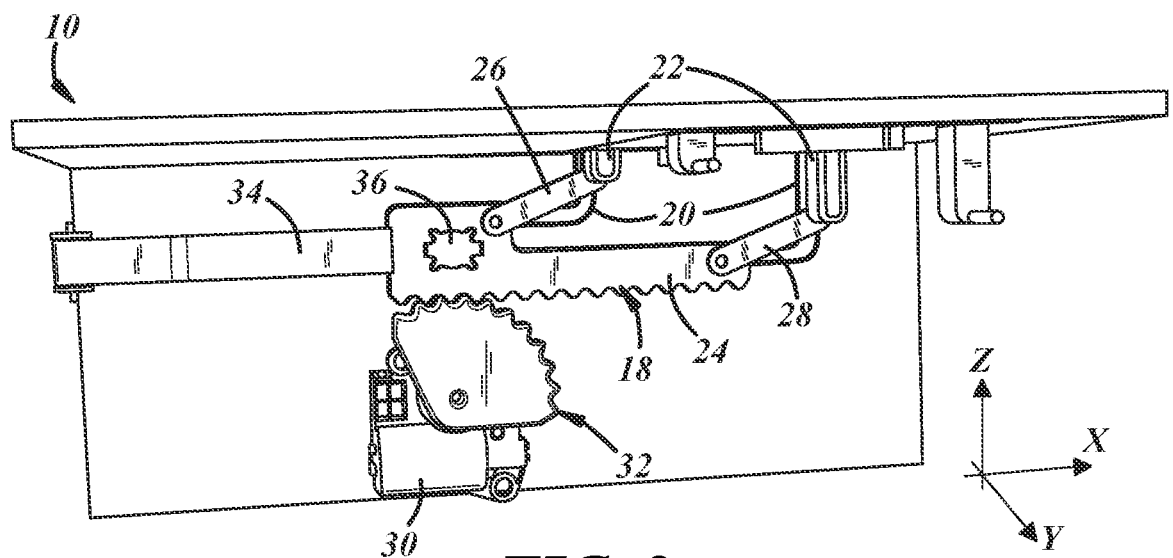
FIG. 2 is a schematic cutaway view of an example of the vehicle interior assembly illustrating a movement mechanism.

The longest dimension of the console 10 is oriented in a longitudinal (X) direction extending between front and rear ends of the vehicle. A transverse (Y) direction perpendicular with the longitudinal direction is shown in FIG. 2 extending between left and right sides of the vehicle. The vertical (Z) direction is perpendicular to the X and Y directions. The opening 16 of the frame 14 lies on or in a plane substantially parallel with the XY plane. As used herein, "substantially" means±5 degrees when referencing angles.

The door 12 can also be any shape or size suitable to close off the opening 16 in the frame 14 and to provide the desired aesthetic. The door 12 presents a decorative surface to the vehicle interior, such as a wood, leather, or fabric surface. The door 12 may also include functional components located beneath the decorative surface, such as sensors embedded within the thickness of the door or guides or other features extending from the non-visible opposite side of the door.

FIG. 2 is a schematic cutaway view of an example of the vehicle interior assembly 10 further illustrating a door movement mechanism 18. The top surface of the door 12 is not visible in this view, but features extending from the back side of the door are visible. The illustrated movement mechanism 18 includes guides 20, followers 22, a shuttle 24, upper and lower links 26-28, a shuttle actuator 30, a transmission 32, a spring 34, a damper 36, and a pair of springs 38 (not visible in FIG. 2). These elements are discussed further in conjunction with FIG. 3.

Figure 3:
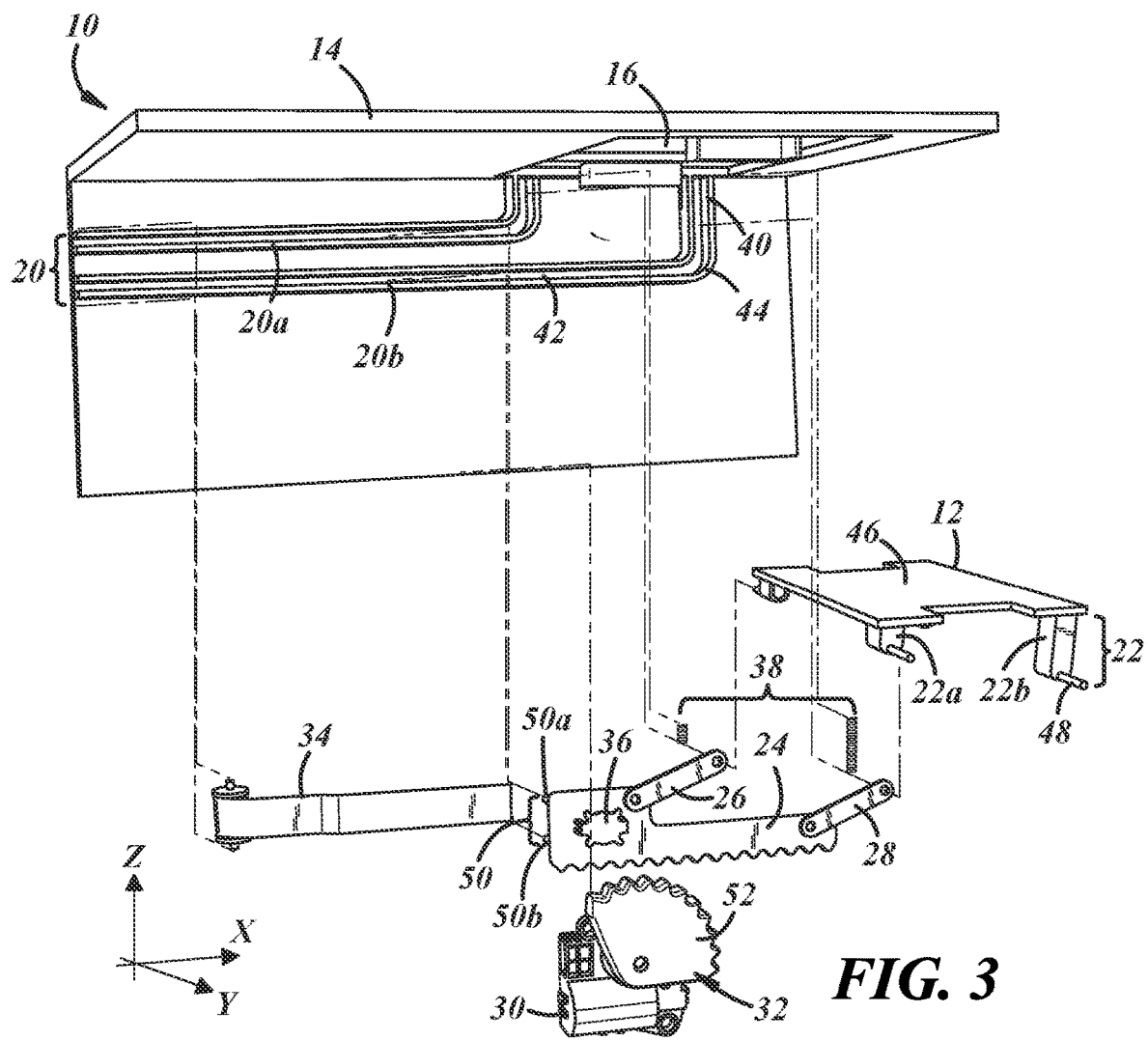
FIG. 3 is an exploded view of the assembly of FIG. 2.

FIG. 3 is an exploded view of the assembly 10 of FIG. 2. The opening 16 in the frame 14 is partly visible in this view and is generally defined in a horizontal (XY) plane. The guides 20 provide a path for the door 12 to follow during movement between the open and closed positions. In this example, the guides 20 include an upper guide 20a and a lower guide 20b, each of which is located along an inner surface of a sidewall of the assembly 10. The illustrated guides 20 are in the form of a track protruding transversely from the sidewall and having a central channel such that the defined path is parallel with a vertical (XZ) plane. Each guide 20 has a first portion 40 extending vertically downward from the frame 14 near the opening 16, a second portion 42 extending horizontally away from the first portion, and a curved transition portion 44 interconnecting the first and second portions to form one continuous guide. These features are also present along the omitted opposite sidewall.

The illustrated door 12 has a decorative top surface 46 that is visible through the opening 16 when the door is in the closed position and concealed from view when the door is in the open position. Upper and lower followers 22a, 22b corresponding to the upper and lower guides 20a, 20b extend from the opposite or bottom side of the door 12 and are configured for sliding movement along the guides 20. Each of the illustrated followers 22 includes a downwardly extending arm and a transversely extending post 48 at the end of the arm. The upper and lower followers 22a, 22b are horizontally spaced by the same amount as the vertical portions 40 of the upper and lower guides 20a, 20b and vertically spaced by the same amount as the horizontal portions 42 of the upper and lower guides 20a, 20b. The guides 20 and followers 22 cooperate to define the movement path of the door and can take many forms, such as single-rail guides fixed along the sidewall and dual-element followers fixed to the door 12 or other suitable arrangements.

The shuttle 24 operates to move the door 12 back and forth between the open position and a dropped position beneath the opening 16. In this example, the shuttle 24 is an L-shaped plate with pairs of posts 50 extending transversely from a side of the plate nearest the sidewall of the assembly 10 and configured to mate with and follow the same guides 20 as the door 12. The shuttle 24 may alternatively or additionally be configured to follow dedicated guides.

The links 26, 28 interconnect the door 12 and the shuttle 24. Each link 26, 28 has a first end pivotably connected to the door 12 and a second end pivotably connected to the shuttle 24. The first end of the upper link 26 is connected to and pivots about a post 48 of an upper follower 22*a* of the door 12, and the second end of the upper link 26 is connected to and pivots about an upper post 50*a* of the shuttle 24. Similarly, the first end of the lower link 28 is connected to and pivots about a post 48 of a lower follower 22*b* of the door 12, and the second end of the lower link 28 is connected to and pivots about a lower post 50*b* of the shuttle 24. The links 28 connect the door 12 and the shuttle 24 in a manner that permits the shuttle to remain vertically stationary during vertical movement of the door. The links 26, 28 are also configured to maintain the horizontal orientation of the door 12 during its vertical movement—i.e., the decorative surface 46 of the door remains parallel with itself at all vertical positions of the door 12. The shuttle 24 and links 26, 28 may be duplicated along the omitted opposite sidewall of the assembly.

The actuator 30 provides kinetic energy to the shuttle 24 via the transmission 32 during at least a portion of the movement of the door between the open and closed positions. In this particular example, the actuator 30 is an electric motor mounted to the inner surface of the assembly 10. The illustrated transmission 32 includes a gear section 52 that is rotatable about a transverse axis. The transmission 32 may include other portions not visible in the figures, such as a portion that converts rotation of the actuator 30 about a longitudinal axis to rotation about the transverse axis of the gear portion and/or a gear reduction portion.

The transmission includes teeth along a perimeter of the gear portion 52 that mesh with teeth along an edge of the shuttle 24 in the manner of a rack-and-pinion system that converts rotational motion of the gear portion to linear motion of the shuttle, or vice versa. As discussed further below, the particularly illustrated example provides kinetic energy to the shuttle 24 via the actuator 30 in one horizontal direction and via the spring 34 in another horizontal direction. The actuator 30 and transmission may be duplicated along the transversely opposite side of the door 12. In some embodiments, only the gear section 52 is duplicated on the opposite side of the door with a rod or other connector rigidly connecting the gear sections for coordinated movement.

The spring 34 is a roller spring including a metal or similarly stiff ribbon with a first end affixed to the shuttle 24 and an opposite second end affixed to a spool that is rotatable about a vertical axis. The spool is in a fixed position along the illustrated sidewall of the assembly 10. The spring 34 has a relaxed condition in which the ribbon is coiled around the spool. When the first end of the ribbon is moved away from the spool, the spring 34 is in an extended condition and stores mechanical energy proportional to the distance of the first end from the spool. Other types of springs, energy storage mechanisms, and/or actuators can be employed in a similar manner.

The damper 36 is configured to slow the release of energy from the spring 34 when moving toward its relaxed condition. The damper 36 may for example be in frictional contact with the sidewall of the assembly 10, one or more of the guides 20, or some other component that remains stationary with respect to the opening 16 or guides 20. The resulting damped movement is smoother and more gradual than the potentially fast and sudden movement that the spring 34 alone would provide.

Each of the pair of springs 38 is located along the vertical portion 40 of one of the upper and lower guides 20*a*, 20*b*. These springs 38 bias the door 12 away from the closed position when the door is in the closed position. In the illustrated example, each spring 38 is a coil spring with a first or top end affixed to the frame 14 and a second or lower end in contact with one of the followers 22*a*, 22*b* of the door 12 when in the closed position. Each spring 38 has a relaxed condition in which its opposite ends are spaced apart by an equilibrium amount. When its opposite ends are moved toward each other from the relaxed condition, each spring 38 is in a compressed condition and stores mechanical energy proportional to the amount of compression. Other types of springs, energy storage mechanisms, and/or actuators can be employed in a similar manner.

Operation of the fall away door 12 via the mechanism 18 of FIGS. 2 and 3 is discussed below with reference to the schematic cross-sectional views of FIGS. 5-8.

Figure 4:
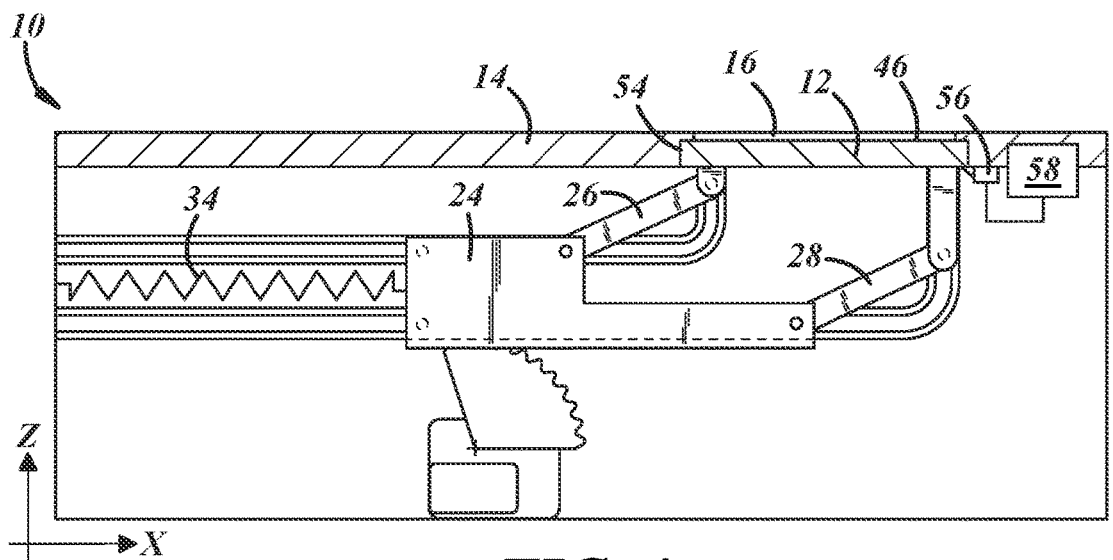
FIG. 4 is a schematic cross-sectional view of the assembly of FIG. 1 and the mechanism of FIGS. 2 and 3 with the door in a closed position.

FIG. 4 illustrates the door 12 in the closed position, in which the door closes off the opening 16 in the frame 14 so that the decorative surface 46 of the door is visible through the opening 16 from the vehicle interior. The illustrated door 12 has a perimeter 54 that is entirely concealed from view from the exterior of the assembly 10 when in the closed position. The door 12 is biased vertically downward toward the dropped position by the springs 38 (not visible in FIG. 4), which are in a compressed condition. The door 12, via the shuttle 24 and links 26, 28, is also biased horizontally away from the opening 16 (to the left in FIG. 4) by the horizontal spring 34 in its extended condition.

One or more latches 56 are in an engaged condition to hold the door 12 in the closed position against the weight of the door and/or the bias of the springs. In this example, the latch 56 is of the type with a latching element that moves parallel with a plane of the door 12 to permit the door to move vertically past the latch in one direction (upward) but not in the opposite direction (downward) when in the engaged condition. The illustrated latch 56 is actuated in response to a sensor 58 configured to detect a user intention to open the door 12. The sensor 58 may for example be a motion sensor, proximity sensor, touch sensor, pressure sensor, gesture sensor, fingerprint reader, or any other suitable sensor. The sensor 58 may be in communication with the latch 56 directly or via a controller to move the latch to a disengaged condition when the user intention to open the door is detected. The illustrated latch 56 is moved to the disengaged condition via a solenoid or other electromagnetic means. In keeping with the modern feel of the fall away door 12, it may be preferred that these elements are non-visible to vehicle occupants and/or integrated with other interior components. The latch 56 may be electro magnetic without moving parts, for example, or a touch display can act as the sensor and/or controller. Other types of latches 56, sensors 58, and/or latch actuators may be employed including push-button switches, manual actuators or latches, microphones, temperature sensors, actuation by voice command, etc.

Figure 5:
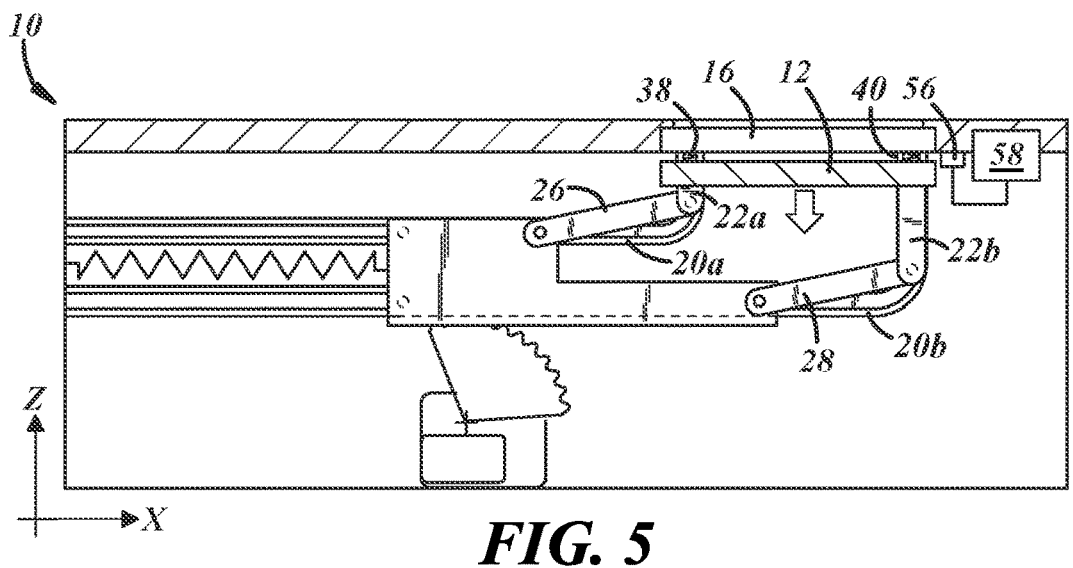
FIG. 5 is the cross-sectional view of FIG. 4 with the door in a dropped position.

In FIG. 5, the latch 56 is changed to the disengaged condition in response to the sensor 58 detecting a user intention to open the door 12. Under its own weight and under the influence of the mechanical energy stored in the springs 38, the door 12 moves vertically downward toward the dropped position. During this stage of door movement, the followers 22*a*, 22*b* of the door 12 move along the vertical first portions 40 of the stationary guides 20*a*, 20*b*, and an angle of the links 26, 28 with respect to horizontal is reduced while the orientation of the door 12 remains unchanged.

In some embodiments, at least a portion of the vertical door movement from the closed position to the dropped position is damped movement. For example, a rotational damper (e.g., a grease damper) can be included at one or more of the pivot joints where the links 26, 28 are attached to the door 12 or shuttle 24. As with the horizontal damper 36, a vertical damper may be configured to slow the release of energy from the springs 38 when moving toward their relaxed condition. The resulting damped movement is smoother and more gradual than the potentially fast and sudden movement that the weight of the door 12 and the optional springs 38 would otherwise cause. Such dampers can be tuned to permit an initially undamped movement that changes to slower, damped movement at some threshold movement velocity. Preferably, a first portion of the vertical movement of the door 12 away from the closed position is undamped movement and a subsequent second portion of the vertical movement of the door away from the closed position is damped movement. In various embodiments, the first 40-80% of the vertical movement of the door 12 away from the closed position is undamped movement and followed by damped movement for the remainder of the vertical door movement. Preferably, initial vertical movement of the door 12 away from the closed position is undamped, and the final 25-40% of downward vertical movement of the door is damped movement.

Figure 6:
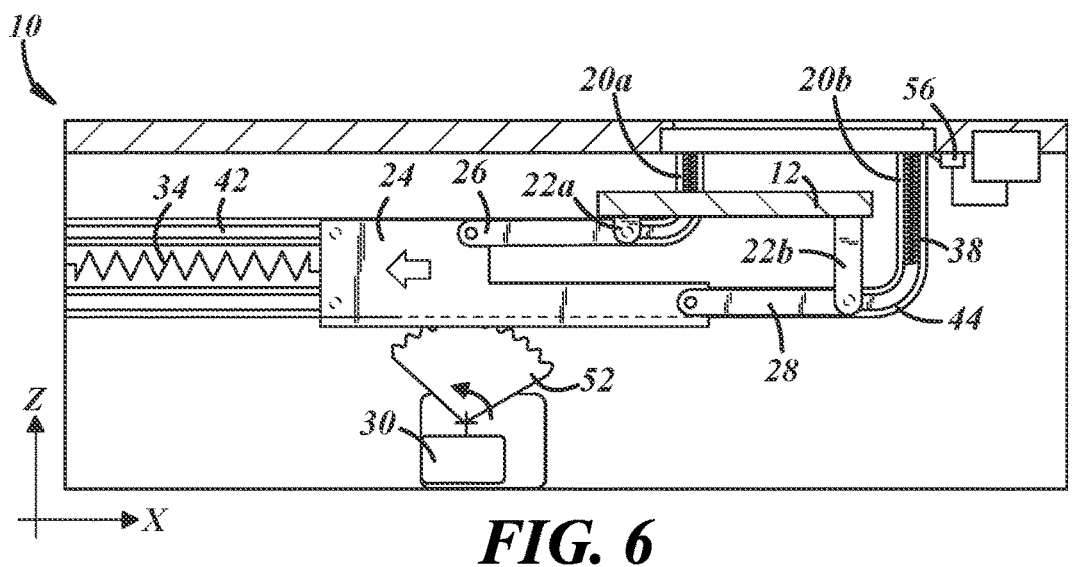
FIG. 6 is the cross-sectional view of FIGS. 4 and 5 with the door moving from the dropped position toward an open position.

FIG. 6 illustrates the door 12 while moving from the dropped position toward the open position under the bias of the horizontal spring 34. The followers 22a, 22b of the door 12 are guided through the transition portions 44 of the guides 20a, 20b and into and along the horizontal second portions 42 of the guides. During this stage of movement the vertical springs 38 are not in contact with the door and are in their relaxed condition, while the horizontal spring 34 is moving toward its relaxed condition. The links 26, 28 are oriented horizontally and move horizontally together with the door 12 and shuttle 24. The actuator 30 is non-energized and configured to permit free rotation of the gear portion 52 about its transverse axis. In some embodiments, the actuator 30 functions as a damper during horizontal movement of the door toward the open position. The latch 56 is changed back to the engaged condition awaiting return of the door 12 to the closed position.

Figure 7:
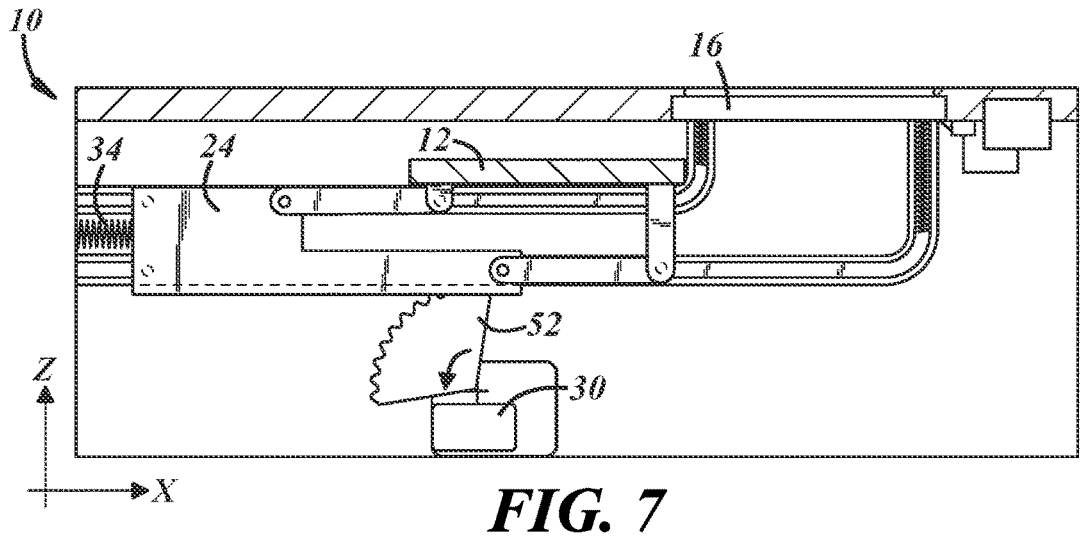
FIG. 7 is the cross-sectional view of FIGS. 4-6 with the door in the open position.

FIG. 7 illustrates the door 12 in the open position, in which it is concealed from view from the exterior of the assembly 10. The open position may be defined by a mechanical stop that blocks the shuttle 24 or door 12 from moving any further horizontally away from the opening 16 or when the spring 34 reached its relaxed condition. The open position can be defined in other ways, such as by a limit switch or a pre-programmed motorized movement by a particular distance. The interior of the assembly is now accessible to vehicle occupants through the opening 16.

Movement of the door 12 back to the closed position is not shown explicitly to avoid redundancy, but movement from the open position to the closed position is generally the reverse of the movement from the closed position to the open position. In this case, the door 12 is moved back toward the dropped position under the power of the actuator 30, which rotates the gear portion 52 (clockwise in the figures), thereby moving the shuttle 24 horizontally along the horizontal portions 42 of the guides 20 toward the opening 16 and moving the followers 22 of the door toward the transition portions 44 of the guides. Movement of the door 12 through the transition portions 44 of the guides moves the first end of the links 26, 28 upward so that the links are angled up about their second ends with respect to horizontal, as in FIG. 5. Further movement of the shuttle 24 away from the open position thus provides an upward component of force on the door 12 in the vertical portions 40 of the guides 20 and toward the closed position, where the latch 56 again holds the door in the closed position. The closing movement can be initiated similar to the opening movement, with the same or a different sensor detecting a user intention to close the door 12 and corresponding energizing of the actuator 30.

Figure 8:
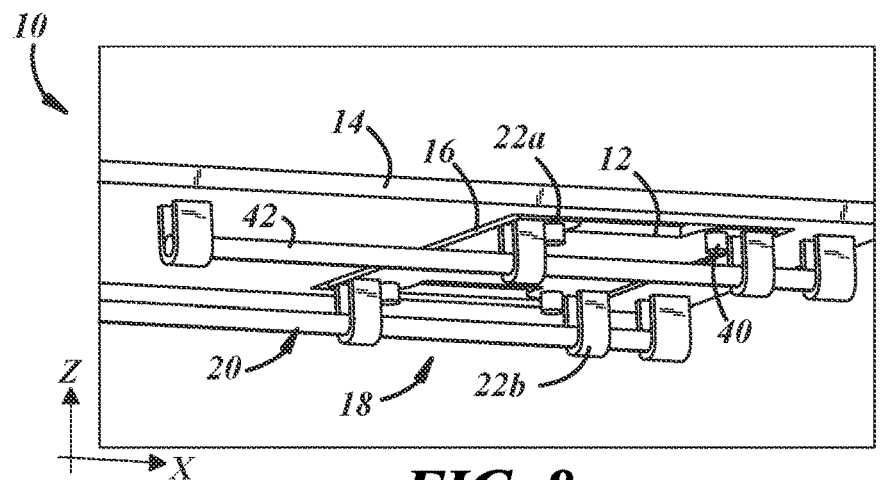
FIG. 8 is a cutaway view from below of the vehicle interior assembly showing a portion of another movement mechanism.

FIG. 8 is a schematic cutaway view of a portion of another example of the vehicle interior assembly 10. As in the above example, the movement mechanism 18 includes guides 20 and followers 22. The mechanism also includes a shuttle 24, actuator 30, and transmission 32 that are not shown in FIG. 8. The door 12 is in the closed position in FIG. 8. The guides 20 provide a path for the door 12 to follow during movement between the open and closed positions. In this example, the guides 20 include cylindrical or otherwise prismatic rods. Each guide 20 has a first portion 40 extending vertically downward from the frame 14 near the opening 16 and a second portion 42 extending horizontally below the first portion 40. The first and second portions 40, 42 of the guides 20 are not interconnected in this example such that each guide 20 is discontinuous. The vertical portions 40 of the guides are relatively short rods extending downward from the frame 14 to an end, and the second horizontal portions 42 of the guides are relatively long rods suspended from the frame 14.

In this case, the upper followers 22a are holes formed through the door 12 and hidden from view when the door is in the closed position. The upper followers 22a are positioned concentric with the first portions 40 of the guides when the door 12 is in the closed position and are configured for sliding movement along the first portions of the guides during movement of the door between the closed and dropped positions. The first portions 40 of the guides 20 cooperate with the upper followers 22a to permit only one degree of freedom of movement during movement of the door 12 between the closed and dropped positions, which is vertical translation. In other words, the first portions 40 of the guides and the upper followers 22a constrain movement in all horizontal directions during movement of the door between the closed and dropped positions.

The lower followers 22b are U-shaped extensions along the back side of the door 12, with the open end of the U-shapes affixed to the door. While the lower followers 22b are configured for sliding movement along the second horizontal portions 42 of the guides 20, they also follow the horizontal portions 42 of the guides during vertical movement between the closed and dropped positions of the door. The second portions 42 of the guides 20 cooperate with the lower followers 22b to permit two degrees of freedom of movement during movement of the door 12, which are vertical translation and longitudinal translation in this example. In other words, the second portions 42 of the guides and the lower followers 22b constrain door movement in the transverse direction.

Operation of the fall away door 12 and the remainder of the movement mechanism 18 of are discussed below with reference to the schematic cross-sectional views of FIGS. 9-11.

Figure 9:
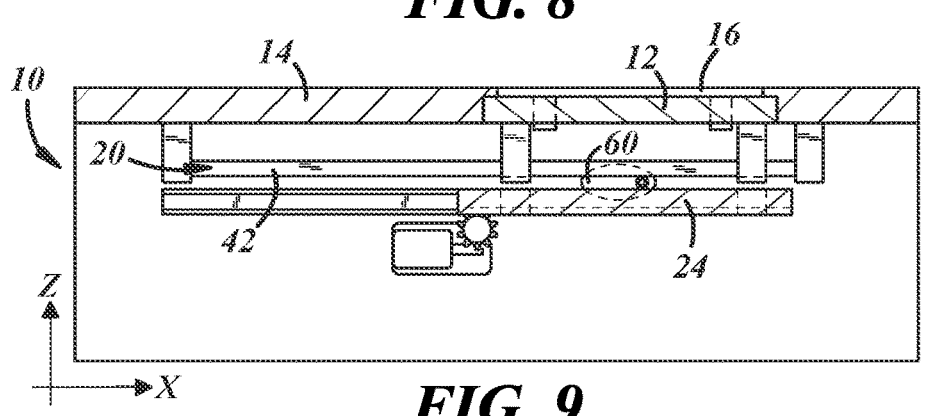
FIG. 9 is a schematic cross-sectional view of the assembly of FIG. 8 with the door in the closed position.

FIG. 9 illustrates the door 12 in the closed position. In this case, the door 12 is not biased in any particular direction when in the closed position, with only its own weight providing any downward force. Though not shown here, one or more latches may be in an engaged condition to hold the door 12 in the closed position against the weight of the door and actuated in response to a sensor configured to detect a user intention to open the door, as in the example of FIG. 4. The illustrated mechanism also includes a return actuator 60, which in this case is a cam configured to rotate about a horizontal axis. The cam 60 is located behind the horizontal portion 42 of the guide 20 and behind the shuttle 24 in FIGS.

9-11 but can be located anywhere beneath the door in the closed position. In FIG. 9, the cam is a disengaged position.

Figure 10:
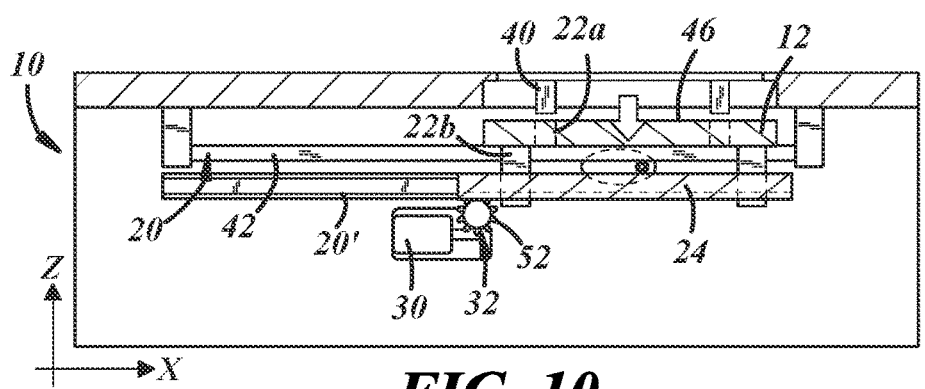
FIG. 10 is the cross-sectional view of FIG. 9 with the door in the dropped position.

In FIG. 10, the latch has been disengaged and the door has reached the dropped position. Under only its own weight, the door 12 moves vertically downward toward the dropped position. During this stage of door movement, the followers 22a formed through the door 12 move along the vertical first portions 40 of the stationary guides 20. In this case, the vertical movement continues past the ends of the vertical portions 40 of the guides and continues until the top surface 46 of the door 12 is below the ends of the vertical portions 40. Continued vertical guidance is provided by the lower followers 22b and the horizontal second portions 42 of the guides 20, even after the door is no longer on the vertical portions 40 of the guides. Vertical movement of the door stops when the door comes into contact with the shuttle 24. In particular, the lower followers 22b of the door 12 are received by corresponding openings or recesses in the shuttle 24, which is a horizontally oriented plate in this example.

As in the previous example, the shuttle 24 operates to move the door 12 horizontally back and forth between the open position and the dropped position beneath the opening 16. In this example, the shuttle 24 follows a dedicated guide 20' with posts or other followers extending from its transverse sides. Also as in the previous example, the shuttle 24 includes teeth along its bottom edges that mesh with the teeth of the actuator-driven transmission 32 to convert rotational motion of the gear portion 52 to linear motion of the shuttle 24 in the manner of a rack-and-pinion system.

In some embodiments, at least a portion of the vertical door movement from the closed position to the dropped position is damped movement. For example, a rotational damper can be affixed to a cam lobe positioned in one or more of the recesses that receive the followers 22b of the door 12. Such dampers may be configured to slow the falling energy of the door 12 and provide a smoother and more gradual mating with the shuttle 24. The dampers can be tuned as discussed above in conjunction with the previous example.

Figure 11:
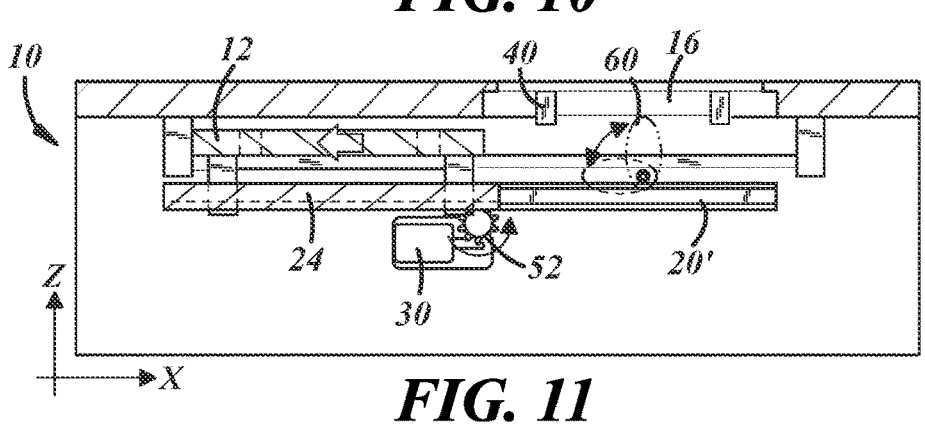
FIG. 11 is the cross-sectional view of FIGS. 9 and 10 with the door in the open position.

FIG. 11 illustrates the door 12 moved to the open position, in which it is concealed from view from the exterior of the assembly 10, from the dropped position of FIG. 10. The energy for horizontal movement toward the open position in this example is provided by the actuator 30 via the transmission 32 and shuttle 24. Free from the vertical portions 40 of the guides in the dropped position, the lower followers 22b of the door 12 are guided along the horizontal second portions 42 of the guides 20. In this case, the open position is reached when the door 12 reaches the end of the horizontal portions 42 of the guides, and the actuator is de-energized. The open position can be defined in other ways, as noted above. The interior of the assembly is now accessible to vehicle occupants through the opening 16.

Movement of the door 12 back to the closed position is not shown explicitly to avoid redundancy, but movement from the open position to the closed position is generally the reverse of the movement from the closed position to the open position. In this case, the door 12 is moved back toward the dropped position under the power of the actuator 30, which rotates the gear portion 52 (clockwise in the figures), thereby moving the shuttle 24 horizontally along the dedicated guide 20' and the door along the horizontal portions 42 of the guides 20 toward the opening 16.

Because the guides are discontinuous in this example, a return actuator 60 may be required to move the door 12 vertically upward to the closed position after it reaches the dropped position from the open position. The cam actuator 60 shown here is only one example and is shown in a quarter-rotated engaged position in phantom in FIG. 11. A solenoid or other suitable return actuator can be employed. Upon actuation of the return actuator, the door 12 is moved upward toward the closed position. The lower followers 22b and the horizontal portion 42 of the guide vertically guide the door for the first portion of movement from the dropped position to the closed position, then the upper followers 22a and the vertical portion 40 of the guide continue to vertically guide the door to the closed position, where a latch again holds the door in the closed position. The closing movement can be initiated similar to the opening movement, with the same or a different sensor detecting a user intention to close the door 12 and corresponding energizing of the actuator 30.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior assembly, comprising:
a frame defining an opening; and
a door having a closed position, in which the door closes off the opening, and an open position, in which the door is concealed from view,
wherein movement of the door from the closed position to the open position includes vertical movement to a dropped position and horizontal movement from the dropped position to the open position, the assembly further comprising a guide configured to constrain movement of the door in all horizontal directions during movement between the closed position and the dropped position.

2. The vehicle interior assembly of claim 1, wherein at least a portion of the movement from the closed position to the dropped position is damped movement.

3. The vehicle interior assembly of claim 1, wherein a first portion of the movement from the closed position to the dropped position is undamped movement and a second portion of the movement from the closed position to the dropped position is damped movement.

4. The vehicle interior assembly of claim 1, wherein the door is configured to move under an influence of only its own weight from the closed position to the dropped position, at least a portion of the movement from the closed position to the dropped position being an undamped falling movement.

5. The vehicle interior assembly of claim 1, wherein at least a portion of the movement between the open and closed positions is motorized.

6. The vehicle interior assembly of claim 1, wherein the door has a perimeter that is concealed from view in the closed position.

7. The vehicle interior assembly of claim 1, further comprising a latch configured to hold the door in the closed position when engaged and to release the door for movement toward the dropped position when disengaged.

8. The vehicle interior assembly of claim 1, further comprising a sensor configured to sense a user intention to open the door.

9. The vehicle interior assembly of claim 1, further comprising a guide configured to guide the door in a longitudinal direction and constrain movement of the door in a transverse direction during movement between the dropped position and the open position.

10. The vehicle interior assembly of claim 1, further comprising a guide having a first portion and a second portion, wherein the door follows the first portion during movement between the closed position and the dropped position, and wherein the door follows the second portion during movement between the dropped position and the open position.

11. The vehicle interior assembly of claim 10, wherein the first and second portions are joined so that the guide is a continuous guide.

12. The vehicle interior assembly of claim 10, wherein the first portion extends downward from the frame to an end, a top surface of the door being below said end when in the dropped position.

13. A vehicle interior assembly, comprising:
a frame defining an opening; and
a door having a closed position, in which the door closes off the opening, and an open position, in which the door is concealed from view,
wherein movement of the door from the closed position to the open position includes vertical movement to a dropped position and horizontal movement from the dropped position to the open position, and wherein the door is downwardly biased when in the closed position such that, when a latch holding the door in the closed position disengages, the door moves toward the dropped position under a force of its own weight and a biasing force.

14. A vehicle interior assembly, comprising:
a frame defining an opening; and
a door having a closed position, in which the door closes off the opening, and an open position, in which the door is concealed from view,
wherein movement of the door from the closed position to the open position includes vertical movement to a dropped position and horizontal movement from the dropped position to the open position, and wherein the door is longitudinally biased when in the dropped position such that, when the door reaches the dropped position from the closed position, the door moves longitudinally toward the open position under a biasing force.

15. The vehicle interior assembly of claim 13, further comprising a guide configured to constrain movement of the door in all horizontal directions during movement between the closed position and the dropped position.

16. The vehicle interior assembly of claim 13, wherein the door is longitudinally biased when in the dropped position such that, when the door reaches the dropped position from the closed position, the door moves longitudinally toward the open position under a longitudinal biasing force.

17. The vehicle interior assembly of claim 16, further comprising a guide configured to constrain movement of the door in all horizontal directions during movement between the closed position and the dropped position.

18. The vehicle interior assembly of claim 13, wherein the door has a perimeter that is concealed from view in the closed position.

19. The vehicle interior assembly of claim 14, further comprising a guide configured to constrain movement of the door in all horizontal directions during movement between the closed position and the dropped position.

20. The vehicle interior assembly of claim 14, wherein the door has a perimeter that is concealed from view in the closed position.

* * * * *